United States Patent

[11] 3,621,373

[72] Inventors Daniel M. Mitchell
Marion, Iowa;
Chandrakant Mehta, Kettering, Ohio
[21] Appl. No. 91,725
[22] Filed Nov. 23, 1970
[45] Patented Nov. 16, 1971
[73] Assignee Collins Radio Company
Cedar Rapids, Iowa

[54] TRANSIENT-FREE SOLID-STATE POWER CONTACTOR
12 Claims, 6 Drawing Figs.
[52] U.S. Cl. .................................................. 323/18,
307/252 UA, 321/5, 323/24
[51] Int. Cl. ...................................................... G05f 3/00
[50] Field of Search ........................................... 307/252
UA; 321/18; 323/18

[56] References Cited
UNITED STATES PATENTS

| | | | |
|---|---|---|---|
| 3,355,653 | 11/1967 | Paradissis ..................... | 321/18 X |
| 3,363,143 | 1/1968 | Cavanaugh ..................... | 317/33 |
| 3,377,542 | 4/1968 | Glorioso ....................... | 321/18 |
| 3,383,582 | 5/1968 | Bishop et al. ................. | 321/18 |
| 3,458,796 | 7/1969 | Cassady ........................ | 321/18 X |
| 3,514,580 | 5/1970 | Brockway ...................... | 219/482 |
| 3,593,075 | 7/1971 | Pantelakis et al. ............. | 318/391 |

Primary Examiner—William M. Shoop, Jr.
Attorneys—Richard W. Anderson and Robert J. Crawford ABSTRACT: A solid-state alternating current power contactor employs silicon controlled rectifier switching elements to attain a ramp turn on by gradually increasing the rectifier conduction angle. Turnoff is effected during zero crossover. Thus transient problems associated with steplike turn on and high current turnoff are obviated.

PATENTED NOV 16 1971

INVENTORS
DANIEL M. MITCHELL
CHANDRAKANT MEHTA

BY R. W. Anderson

AGENT

INVENTORS
DANIEL M. MITCHELL
CHANDRAKANT MEHTA

BY *R. W. Anderson*

AGENT

INVENTORS
DANIEL M. MITCHELL
CHANDRAKANT MEHTA

BY R.W. Anderson
AGENT

TRANSIENT-FREE SOLID-STATE POWER CONTACTOR

This relates generally to power input switching an more particularly to a solid-state power contractor to be utilized in switching single phase or multiphase power to a power supply in a transient-free manner.

The present invention is particularly useful in the switching of input power to the primary winding of a power supply transformer in applications when the secondary of the power supply transformer is rectified and applied to an LC filter. A step application of power in such applications may generate damaging high voltages caused by high inrush currents to the filter of the power supply. Further problems relate to the turnoff of said power supplies, especially in the instances when turnoff is to be effected in response to an overload current sensor, in which cases the time to effect turnoff either mechanically or electrically may be great enough to permit damaging currents to flow before turnoff is completed. This is particularly undesirable in airborne applications.

The use of mechanical contactors such as relays or input switches in high power applications have three significant undesirable characteristics. Mechanical contactors such as relays or input switches in high power applications have three significant undesirable characteristics. Mechanical contactors can cause severe turn-on transients. Mechanical contactors cause severe turnoff transients, and the time between turnoff command and actual current interrupt may be sufficiently long to permit damage before turnoff is actually effected.

In most power supply applications where a three phase power contactor is presently employed, the input voltage is fed to a power transformer the output of which is full wave rectified and filtered for use as a supply of DC power. When the contactor is closed to apply line power, it allows two transient currents to flow. It allows a transformer in-rush current which is typically eight times full load current, and it allows the filter capacitor charging current. The capacitor charging current can cause the DC output voltage to oscillate temporarily and reach a peak value which might be well in excess of the desired steady state limit. The contactors themselves are normally rated to withstand these surge currents, but the power supply load may be damaged due to the output voltage overshoot, and severe line transients can be generated which in practice may effect other instrumentation receiving power from the same source. A particular example which serves to demonstrate the described problem is a power amplifier tube which receives high voltage DC from a power supply which employs an LC filter. The response of the LC filter to a step application of input power can result in a DC voltage overshoot of 25 percent which can cause the power amplifier tube to arc over, and become permanently damaged.

When the primary AC current is interrupted by the contactor, transients are generated by the arcing of the contacts and the energy trapped in the leakage reactances of the transformer, causing interference and abnormal voltages which the rectifiers must be specified to withstand.

Further, the several millisecond delay between turnoff command and actual turnoff of a mechanical device, while not causing any additional difficulty when the turnoff is intentional, gives rise to a problem when an associated output current monitor senses an overcurrent condition. In this case, by the time the contactor responds to the turnoff command from the monitor, the abnormally high current may have increased further to a value significantly greater than the contactor is rated to interrupt, causing severe arcing and burning of the contacts.

As a result, the use of a mechanical contactor for protection of a power supply and its loads is generally undesirable.

The above-defined general problem areas suggest an inherently faster electronic approach to the application and removal of power.

Electronic contactors have been employed in the art which utilize silicon controlled rectifier switching devices to control turnoff of power such that turnoff is effected at a zero crossover of the alternating current waveform, thus eliminating turnoff transients. This is an inherent feature of the silicon controlled rectifier device. However, such applications have generally not included means to effect transient-free application of input power. The widely used technique of applying power through silicon controlled rectifiers at a zero crossover of the alternating voltage waveform can minimize radio frequency interference bursts, but does not reduce the transformer in-rush or output voltage overshoot problems.

Accordingly, the object of the present invention is generally that of providing a solid-state electronic power contactor which overcomes the above-defined problems. The present invention is featured in the employment of silicon controlled rectifiers as switching elements in power input lines in a circuitry which solves the turn-on transient problem by gradually increasing the conduction angles of the silicon controlled rectifiers from approximately 0° degrees to 180° during the turn-on cycle.

The invention is featured in the provision of a silicon controlled rectifier conduction angle control circuitry by means of which input power is applied gradually through the electronic power contactor to subsequent rectifying circuitries. In this sense the control circuitry of the present invention provides a "soft-start" feature wherein input power, upon initiation of a turn-on command, is not applied in step fashion but rather is applied in a gradually increasing fashion from a small percentage of the input power to its full value. The application of power is applied on a progressively increased basis over a predetermined number of cycles of the input voltage.

The invention is further featured in provision of a power on-off control circuitry which is digitally operated and operates to accomplish a predetermined time controlled turn-on characteristic and an immediate turnoff command.

Figure 1:
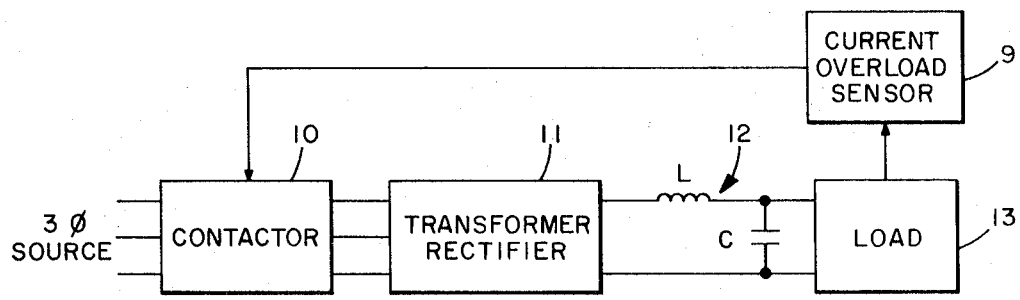
FIG. 1 is a functional schematic diagram of a typical three-phase power supply with which the contactor of the present invention is effective in insuring switching transient elimination.

The typical power contactor and its relationship with a three-phase power source, a transformer rectifier, a power supply filter, and load is depicted functionally in FIG. 1. While the present invention deals specifically with the contactor, block 10 of FIG. 1, the relationship and significance of the action of the contactor 10 with respect to the typical power supply circuitry might first be examined.

FIG. 1 illustrates three-phase contactor by means which input voltage is fed to a step-up power transformer 11. The output from the transformer rectifier 11 is rectified and filtered by filter 12 for use, for example, as the plate supply of a vacuum tube power amplifier depicted as load member 13. As above discussed, when the contactor 10 is closed, it permits two transient currents to flow through it. The first transient current is the transformer in-rush current which may be shown to be typically as great as eight times full load current. The second transient current is a capacitor charging current into the LC filter which, as above discussed, may cause the output voltage to ring and reach a peak value well in excess of the desired steady state limit. An overload sensing device 9 is shown associated with the load 13 with a tie back to the contactor 10 by means of which automatic power interrupt may be effected should an overload condition be sensed.

Figure 2:
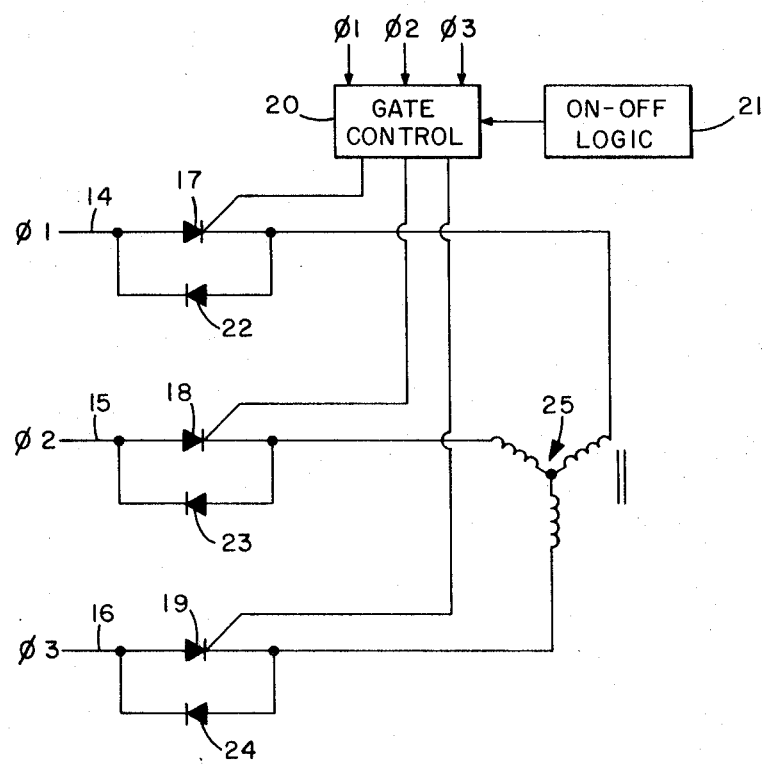
FIG. 2 is a simplified partial schematic diagram of the employment of silicon controlled rectifier switching elements in the lines applying primary power to a three-phase supply.

In accordance with the present invention power contactor 10 is electronic in nature and employs silicon controlled rectifier (SCR) switching elements in each of lines as depicted functionally in FIG. 2. FIG. 2 represents three input lines 14, 15 and 16 upon which input power is selectively applied through the electronic contactor to the primary winding 25 of a power transformer. SCR elements 17, 18, and 19 are serially interconnected in a first polarization between each of the input lines 14–16 and respective windings of the power transformer primary 25. Further, diode members 22, 23, and 24 are connected with respective opposite polarization in parallel with the SCR elements to provide the necessary return path for the power. Since in the three-phase application the primary winding 25 of the power transformer is not referenced to ground, only three SCR's, each with an associated reverepolarized diode member, are necessary to control the application of power.

FIG. 2 depicts functionally a gate control circuitry 20 which provides respective outputs to the gate elements of each of the SCR's and is depicted as having the three phase input lines as inputs thereto. A further input is depicted from a functional on-off logic block 21. In general operation, the function of the gate control circuitry 20 and on-off logic 21 effects the aforedefined objectives of the invention — that is, the gradual application of power to primary winding 25 of the transformer during turn on and removal of power during zero crossover occurrences of the input power cycle.

The gradual application of power will be accomplished by a gradual increase in the conduction angles of the silicon controlled rectifiers during starting.

Figure 3:
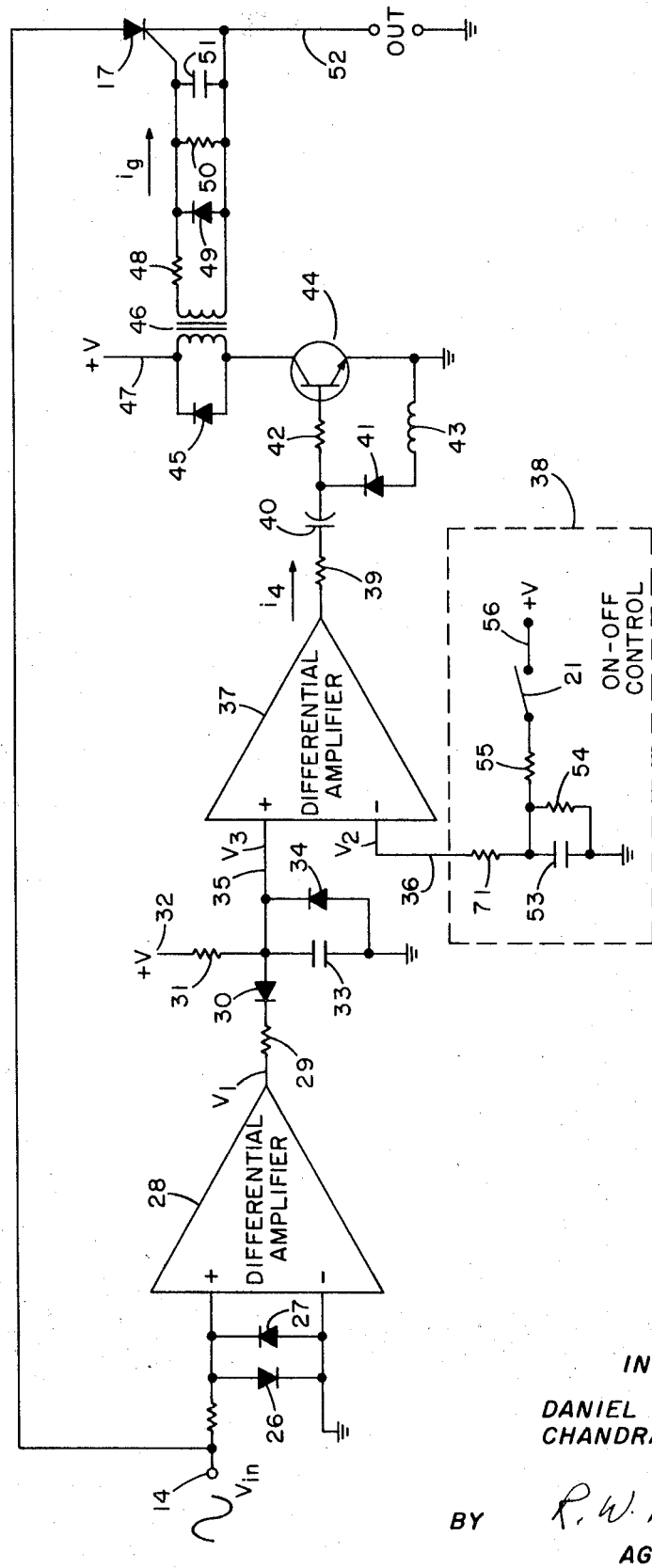
FIG 3 is a functional schematic diagram of a basic switching control circuitry in accordance with the present invention by means of which power is gradually applied and immediately removed with respect to an output terminal.

FIG. 3 represents a basic circuitry for accomplishing the objectives of the invention. The basic circuit of FIG. 3 may be employed repeatedly for each phase of a multiphase application. In general function, the basic circuitry of FIG. 3 receives one of the input lines as an input thereto and, through its associated silicon controlled rectifier, switches the associated input line to an output terminal. Actually, predetermined, portions of alternate half-cycles of the input voltage applied to the basic circuitry are switched to the output line and these predetermined portions are in turn determined by the conduction angle of the associated silicon controlled rectifier switching element. The conduction angle of the silicon controlled rectifier switching element in turn is progressively increased during turn on, and turnoff is effected at the time occurrence of the first input signal zero crossing following turnoff command.

Referring to Fig. 3 the basic functioning might be defined as the determination or detection of the positive going crossover of the applied voltage and using this detected point as a reference point to connect the particular input phase to the output line at a predetermined time such that the initial connection will appear slightly before the next occurring negative zero crossover of the phase being connected. One cycle later, a second connection is made at a time a little further removed from this negative crossover so that a progressively larger amount of power is connected to the output line. The circuitry gradually connects successively increasing portions of alternate half-cycles of the input signal to the output line such that the power applied to the output line is built up gradually over a number of cycles rather than the traditional application of input power where the SCR conduction time is initially a full half-cycle.

As in other switching applications employing silicon controlled rectifiers, control is realized by controlling the time generation of a positive gate pulse applied to the gate electrode of the silicon controlled rectifier switching element during a period of time when the anode of the SCR is positive with respect to the cathode. Once gated under these conditions, the SCR continues to conduct until the anode potential is no longer positive with respect to the cathode. In alternating current application, the application of the alternating current as anode-cathode biasing waveform automatically establishes the receptive bias condition during alternate half-cycles and thus the present invention, as in other applications employing silicon controlled rectifier regulation, provides for SCR gate generation during the time occurrences of successive ones of "positive" half-cycles of the applied power.

With reference to FIG. 3, a zero-crossing reference for the alternating current waveform applied on input terminal 14 is established by first applying the input waveform to paralleled and oppositely polarized diode members 26 and 27 which clip the input waveform for application to differential amplifier 28. The output $V_1$ from differential amplifier 28 is a square wave illustrated in waveform (b) of FIG. 4 as having, for example, a swing of +12 volts to 12 volts. The output from differential amplifier 28 is applied through resistor 29 and diode member 30 to the junction between resistors 31 and capacitor 33, the latter being respectively serially connected between a positive voltage source 32 and ground. Capacitor 33 is shunted by a diode member 34 polarized as illustrated. Voltage at the junction, defined as $V_3$, is applied to the noninverting input of a further differential amplifier 37. As will be further discussed, an inverting input $V_2$ to differential amplifier 37 is applied on line 36 form an on-off control circuitry generally designated by reference numeral 38. $V_2$ is a reference control voltage.

Figure 4:
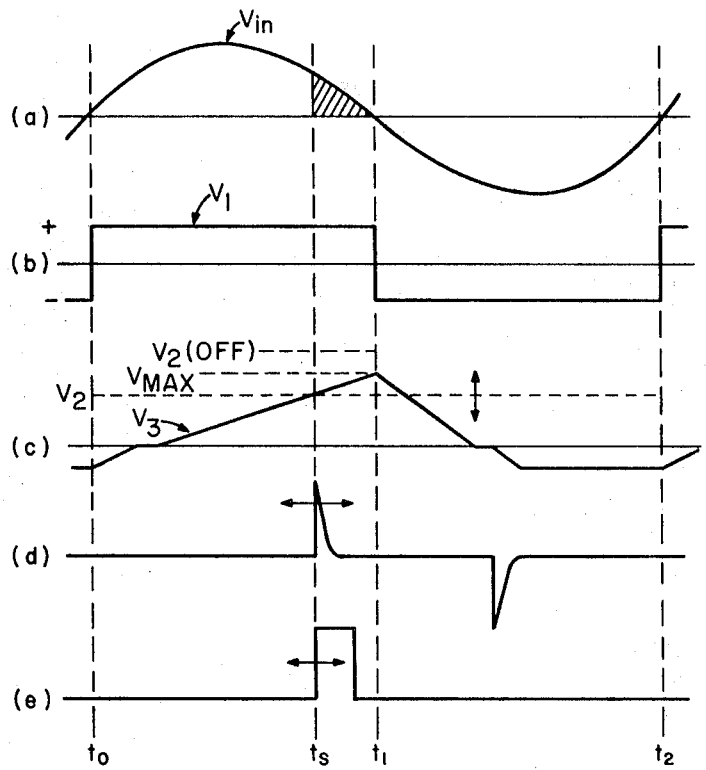
FIG. 4 represents operational waveforms of the basic switching control circuitry of FIG. 3.

Considering that the output from differential amplifier 28 is at a negative level as depicted between times $t_1$ and $t_2$ in waveform (b) of FIG. 4, capacitor 33, which would have been charged by the previous half-cycle of operation, discharges through the diode member 30 and the resistor 29 to slightly below ground potential as determined by the voltage drop across diode member 34. At time $t_2$ the output of differential amplifier 28 again becomes positive as shown in waveform (b) of FIG. 4. At time $t_2$, since the junction between resistor 31 and capacitor 33 is at ground potential, diode member 30 is nonconductive even though the source 32 is a positive source. Thus, at time $t_2$ capacitor 33 begins to charge positively from the voltage source 32 through resistor 31 toward a predetermined voltage level $V_{max}$ depicted in waveform (c) of FIG. 4. The predetermined level toward which capacitor 33 charges is determined by the particular charging time constant and the period of time defined for a half-cycle of operation which is illustrated in FIG. 4 as being the time between $t_0$ and $t_1$. Due then to the particular time constant and time involved, at time $t_l$ capacitor 33 will have charged to $V_{max}$ (for example, 5 volts).

The junction voltage $V_3$, as depicted in waveform (c) of FIG. 4, is applied to the noninverting input terminal of differential amplifier 37. The inverting input terminal of differential amplifier 37 receives a reference voltage $V_2$. In general operation, when the ramplike junction waveform $V_3$ rises to exceed the reference voltage $V_2$, differential amplifier 37 switches to generate a current impulse as depicted in waveform (d) of FIG. 4. As will be further described, the time occurrence of this current impulse occurs at time $t_x$ and $t_x$ is made to vary within the time period $t_0$–$t_1$ as a function of the reference voltage $V_2$ applied to differential amplifier 37.

The current impulse output from differential amplifier 37 is applied through resistor 39, capacitor 40, and resistor 42 to the base of transistor 4. Transistor 44 winding 43, diode 41, diode 45, and transformer 46, in conjunction with voltage source 47, comprise a blocking oscillator. In response to each time occurrence of the current impulse from differential amplifier 37, the blocking oscillator develops an output waveform of predetermined pulse width as designated in waveform (e) of FIG. 4. Noting that the input waveform 14 is also applied across the anode-to-cathode junction of silicon controlled rectifier 17, and that the time occurrence $t_x$ of the blocking oscillator output pulse occurs sometime during the positive half-cycle of this waveform, it is seen that SCR 17 is rendered conductive at the time occurrence of the blocking oscillator pulse and remains conductive for the ensuing portion of that positive half-cycle of the input waveform 14 during which the blocking oscillator control pulse occurs.

Considering that it is desired that the contactor be opened (that is, no current impulse be generated by differential amplifier 37 during a particular half-cycle when silicon controlled rectifier 17 may be gated into conduction) the switch 21 in the on-off control circuitry 38 may be closed (logic 1) such that the reference voltage $V_2$, applied to differential amplifier 37, is a fixed level defined by supply 56. Voltage 56 might then be chosen to be 6 volts — that is, a level in excess of the maximum voltage $V_{max}$ that may possibly appear across capacitor 33, and thus in excess of the maximum voltage to which the noninverting input $V_3$ to differential amplifier 37 may ever rise. Since $V_3$ by design may then never reach the voltage level defined by the control voltage source 56 (designated $V_2$ (OFF) in waveform (c) of FIG. 4), differential amplifier 37 is never allowed to switch and silicon controlled rectifier 17 remains nonconductive.

During the time when the switch 21 in on-off control 38 is closed (logic O), capacitor 53 will have charged to the $V_2$ (OFF) reference level defined by reference voltage source 56. When switch 21 is opened (logic 1), the charge on capacitor 53 discharges at a rate determined by the time constant capacitor 53 and resistors and 55, and decays toward zero volts. The reference voltage $V_2$ will decay to a level where it may be exceeded by the ramplike voltage $V_3$. Differential amplifier 37 switches to develop an output current pulse which subsequently gates on the associated silicon controlled rectifier. The decay characteristic of the voltage developed across capacitor 53 in the on-off control 38 thus establishes a rate at which the time occurrence $t_s$ of the trigger pulse from differential amplifier 37 (waveform (d) of FIG. 4) progresses from time $t_1$ to time $t_o$ during alternate half-cycles of the input signal. Therefore, on a cycle to cycle basis, the differential input voltage to differential amplifier 37, as determined by the respective waveforms $V_3$ and $V_2$) crosses over earlier and earlier in successive half-cycles. In a typical embodiment the crossover might traverse from the time $t_1$ towards $t_0$ during 10 cycles of the input waveform 14. Since successively larger portions of the positive half-cycles of the input waveform are switched to the output as a function of the rate at which the crossover point progresses towards time $t_o$, the power applied to the output terminal is progressively increased at a predetermined rate from a very minimal level to essentially full power so as to establish a "soft" application of input power to the output terminal, i.e., to establish a ramp function turn on rather than the traditional step function turn on. Complete application of power is determined when reference voltage $V_2$ is essentially zero, and the differential amplifier switch time $t_s$ is nearly coincident with the zero crossover defined by time $t_o$ in FIG. 4.

In this manner, upon the opening of the switch 21 in the on-off control 38, the application of input power from terminal 14 to output terminal 52 is on a gradually increasing basis to obviate the problems associated with step function power application.

Figure 5:
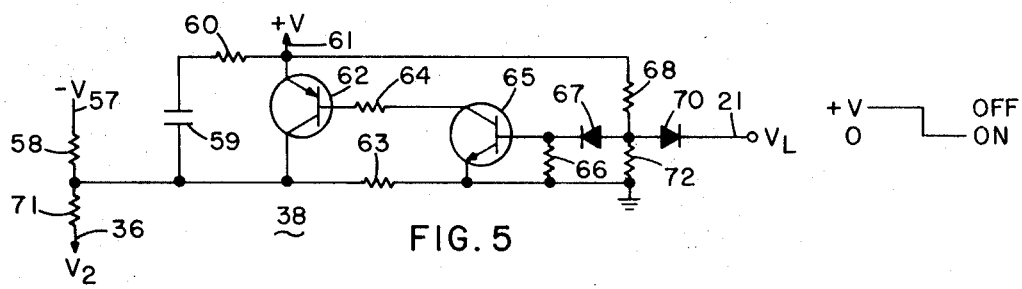
FIG. 5 illustrates improved logic control circuitry for operation with the basic control circuitry of FIG. 3.

The on-off control of circuitry 38 of FIG. 3, in establishing a ramp turn on as concerns power application, also establishes a time constant to accomplish turn off. An alternate embodiment of on-off control 38 is depicted in FIG. 5 which advantageously effects nearly instantaneous turn off commands while retaining the desired gradual attainment of turn on. With reference to FIG. 5, a switching transistor pair 62, 65 is combined in circuit such that each of the transistors is either fully saturated or off. The transistor switching pair 62, 65 is designed to be made very rapidly conductive by application of a positive logic voltage on the $V_L$ terminal 21. Assuming then that transistors 62 and 65 are fully saturated, a low impedance source is effected between voltage source 61 and the junction between resistors 58 and 71. Thus in the "off" state, the reference voltage on line 36 (reference voltage $V_2$) is essentially equal to the level of the voltage source 61 which, as in the previously described embodiment, establishes a reference voltage $V_2$ (OFF) in excess of the maximum voltage to which capacitor 33 in FIG. 3 may charge in one-half cycle. Thus the voltage $V_3$ does not cross over the reference voltage $V_2$, and differential amplifier 37 does not generate an output current pulse.

In order for transistor 62 of FIG. 5 to be saturated and apply $V_2$ max (as established by voltage source 61) as the reference voltage $V_2$, transistor 65 must also be saturated, and this is achieved by base current flowing from the source 61 through resistor 68 and diode member 67.

During the off-state of the contactor, the control voltage applied to the cathode electrode of diode 71 from control source 21 is at a level corresponding to that of voltage source 61. Due to the voltage dividing action of resistors 68 and 67, the diode member 70 is back-biased, and all the current generated through resistor 68 from the source 61 is allowed to go into the base of transistor 65, allowing transistor 65 to be saturated and thus driving transistor 62 to saturation.

When the contractor is to be turned on, the logic signal applied on terminal 21 to diode 70 becomes a logic "zero," and the current generated through resistor 68, which had been going into the base of transistor 65, is now diverted through diode member 70. As a result, transistor 65 turns off, causing transistor 62 to also turn off. The reference voltage applied on line 36 is then determined by the path from ground through resistor 63 and resistor 58 to a negative voltage source 57, and additionally through capacitor 59 and resistor 60. Ignoring for a moment capacitor 59 and resistor 60, and considering that transistor 62 has been off for a long period of time, the reference voltage appearing on line 36 is essentially ground. The reference voltage under this condition may actually be slightly less than ground as determined by the voltage dividing action of resistor 63 and resistor 58; however, the path that the reference voltage takes to get from the level of source 61 to ground is determined by the time constant of resistor 60 and capacitor 59.

The on-off control circuitry of the embodiment of FIG. 5 then has an advantage over the previously discussed circuitry in that turn off can be accomplished essentially immediately without having to go through the same time constant as the turn-on time experienced. The actual turnoff time is the interval between the turnoff command and the negative-going zero crossing of the phase current of the last phase of a multiphase system, e.g., phase C in a three-phase system where the sequence is ABC.

Figure 6:
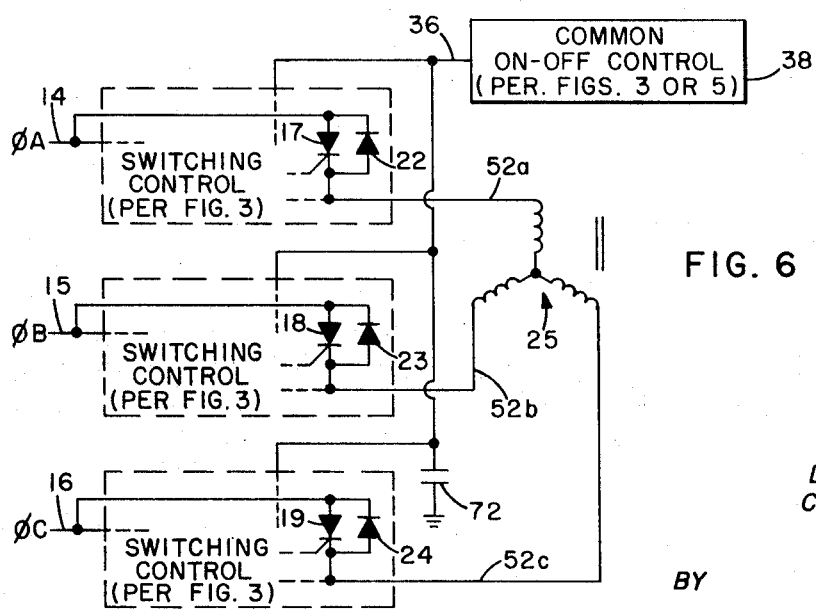
FIG. 6 is a functional schematic diagram illustrating the use of three basic switching control circuitries in a three-phase power contactor application.

A multiple application of the basic switching control circuitry of FIG. 3 in a three-phase power contactor is depicted in FIG. 6 wherein each of three input lines 14, 15 and 16 are applied to identical circuitries per FIG. 3. FIG. 6 depicts a FIG. 3 circuitry block in each input line. One on-off control circuitry 38 is utilized in common to dictate turn on and turnoff. Thus the output 36 from the on-off control circuitry 38 of FIG. 6 is depicted as supplying a common reference voltage 36 ($V_2$) which is applied as the inverting input to the differential amplifier 37 of each of three circuitries embodied per FIG. 3. The common on-off control circuitry 38 is depicted as being either that illustrated in FIG. 3 or as the preferred embodiment of FIG. 5.

Each of the SCR switching elements of FIG. 6 is shunted with a reverse polarized diode to provide appropriate current return paths. As previously discussed, since the neutral of the transformer 25 is ungrounded, it is sufficient to have diode members 22, 23, and 24 shunting the respective silicon controlled rectifiers rather than using silicon controlled rectifiers for this purpose because, in the absence of the transformer neutral being grounded, current cannot go back through a rectifier, so to speak, without first coming in through a silicon controlled rectifier in one of the other two phases. Therefore, only three silicon controlled rectifiers are necessary to have complete control over the primary current applied to transformer winding 25.

FIG. 6 further includes a capacitor 72 connected between the common reference voltage line 36 and ground. Capacitor 72 decouples noise transients which might tend to cause the differential amplifiers in the SCR switch circuitries to switch at a nondesirable time. Capacitor 72 thus provides a low-impedance path for any high-frequency transients which might be generated in the system in some fashion, since, even though the logic signal may dictate a particular time at which one of the differential amplifiers in the SCR switch circuitries should fire, a noise spike in the system could cause one of the differential amplifiers 37 to change state before the logic signal dictated. Capacitor 72 would be implemented as a small capacitor designed to smooth out high-frequency transients.

With reference to both FIGS. 3 and 5, reference voltage from the on-off control circuitry is applied to line 36 through a resistor 71 so as to decouple high-frequency transients. Resistor 71 acts as a series resistance in conjunction with capacitor 72 of FIG. 6 to provide a voltage drop across which noise transient spikes could appear. In this respect resistor 71 and capacitor 72 act as a high-frequency filtering circuit. Resistor 71 has a value very small compared to the source impedance of the differential amplifiers 37 employed in the SCR switching circuitries, such that the resistor 71 does not affect or enter into the normal operation of the SCR switching circuitries.

The present invention is thus seen to provide a means for rapidly effecting interruption of power in less than one-half cycle of the supply frequency due to the turn-off action inherently related to silicon controlled rectifiers. Transient problems associated with step input power application are obviated by effecting a soft "turn on" of power.

Although the present invention has been described with respect to particular embodiments thereof, it is not to be so limited as changes may be made therein which fall within the scope of the invention as defined in the appended claims.

We claim:
1. A power contactor for controlling the application of an alternating current power source between an input terminal and an output terminal comprising a silicon controlled rectifier member comprising an anode electrode and cathode electrode and a control electrode, means for applying said power source across the anode-to-cathode junction of said rectifier element, means for detecting the zero crossovers of said power source, means receiving the output from said zero-crossing detection means and being responsive to successive ones of the positive-going zero crossovers of said power source to initiate a ramplike control signal having essentially linear voltage rise between substantially zero volts and a predetermined maximum control voltage magnitude, said maximum control voltage magnitude being attained at the time occurrence of negative going zero crossovers of said power source, means for generating a selectively variable reference voltage, said reference voltage varying between a predetermined maximum voltage in excess of said maximum control voltage to a substantially zero voltage level during the time period defined by successive ones of the positive going half-cycles of said power source, current impulse generating means, said current impulse generating means receiving said reference and control voltages as respective inputs thereto and being adapted to generate an impulse at those times during successive ones of the positive half-cycles of said power source when said reference voltage falls to a value less than that of said control voltage, and means responsive to said current impulses for gating said silicon controlled rectifier element into conduction at the time occurrence of successive ones of said current impulses, whereby the conduction angle of said silicon controlled rectifier is progressively decreased during the time occurrence of successive ones of the positive half-cycles of said power source and predetermined greater portions of the successive ones of the positive half-cycles of said power source are switched to said output terminal.

2. Means as defined in claim 1 wherein said current impulse generating means comprises a differential amplifier to which said reference and control voltages are applied as respective first and second inputs, said differential amplifier being adapted to switch from a first saturation voltage level to a second and oppositely polarized saturation voltage level when said control voltage input crosses over the instantaneous magnitude of reference voltage input applied thereto, and output means associated with said differential amplifier to generate a current impulse in response to said aforedefined differential amplifier input voltage crossover.

3. Means as defined in claim 2 wherein the current impulse output from said differential amplifier output means is supplied as triggering input to a blocking oscillator, the output from said blocking oscillator comprising a pulse of predetermined width the time occurrence of which is coincident with that of said current impulse, the output from said blocking oscillator being applied between the control and cathode electrode of said silicon controlled rectifier to comprise a gating impulse for said silicon controlled rectifier.

4. Means as defined in claim 3 wherein said reference voltage generation means comprises a capacitor the voltage across which comprises said reference voltage, a reference voltage source the magnitude of which comprises said maximum reference voltage magnitude, and means for selectively applying said reference voltage source through resistive means to charge and discharge said capacitor.

5. Means as defined in claim 3 wherein said reference voltage generation means comprises a reference source voltage the magnitude of which exceeds said maximum control voltage magnitude, a transistor switching means, a reference voltage output terminal, said reference voltage source being connected through the emitter-collector junction of said transistor switching means to said output terminal, RC time constant means, said reference voltage source being additionally connected through said RC time constant means to said reference to said reference voltage output terminal, means for applying first and second logic voltage levels to the base electrode of said transistor switching means, said transistor means being responsive to a first one of said logic voltage levels to render said transistor switching means conductive to effect a low impedance path between said reference voltage source and said reference voltage output terminal, said transistor switching means being responsive to the second one of said logic voltage levels to render said transistor switching means nonconductive whereby the voltage on said reference voltage output terminal varies between a maximum value defined by said reference voltage source and a value substantially equal to zero volts at a rate determined by said RC time constant means, said first logic voltage level being effected in response to an "OFF" command being initiated, and said second logic voltage level being effected in response to an "ON" command being initiated.

6. A multiphase power contractor for control switching of a multiphase power source between multiphase input terminals and respective primary windings of a muhtiphase power transformer primary winding comprising a plurality of switching control means each of which is associated with one of said power source input lines; each of said switching control means comprising a silicon controlled rectifier element serially connected between the associated one of said power source input lines and associated one of said power transformer primary windings, a plurality of switching control means respective ones of which are associated with the silicon controlled rectifier in each of said lines, each of said plurality of switching control means comprising means responsive to successive ones of the positive going zero crossovers of the applied power source phase to initiate a ramplike control signal varying between substantially zero volts and a predetermined maximum control voltage magnitude at the duration of the ensuing half-cycle of the applied power source phase, a source of reference voltage variable between a maximum reference voltage in excess of said maximum control voltage level during the time period defined by successive one of the positive going half-cycles of the applied power source phase, current impulse generating means receiving said control and reference voltages and being responsive thereto to generate a current impulse during successive ones of the positive half-cycles of said applied power source phase when said reference voltage falls beneath said control voltage; said source of reference voltage comprising a a common reference voltage source generating means the output of which is applied to each of said plurality of switching control means, and the cathode-to-anode junction of each said silicon controlled rectifier element being shunted with an oppositely polarized one of a plurality of diode members.

7. Means as defined in claim 6 further comprising a resistive member through which said reference voltage is serially applied in common to said plurality of switching control means and a capacitor through with the reference voltage as applied through said resistive member is shunted to system ground, whereby high-frequency transients appearing on the output of said reference voltage generating means are rendered ineffective in initiating a gating influence on said silicon controlled rectifier.

8. Means as defined in claim 6 wherein said reference voltage generation means comprises a capacitor the voltage across which comprises said reference voltage, a reference voltage source the magnitude of which comprises said maximum reference voltage magnitude, and means for selectively applying said reference voltage source through resistive means to charge and discharge said capacitor.

9. Means as defined in claim 6 wherein said reference voltage generation means comprises a reference source voltage the magnitude of which exceeds said maximum control voltage magnitude, a transistor switching means, a reference voltage output terminal, said reference voltage source being connected through the emitter-collector junction of said transistor switching means to said output terminal, RC time constant means, said reference voltage source being additionally connected through said RC time constant means to said reference voltage output terminal, means for applying first and second logic voltage levels to the base electrode of said transistor switching means, said transistor switching means being responsive to a first one of said logic voltage levels to render said transistor switching means conductive to effect a low impedance path between said reference voltage source and said reference voltage output terminal, said transistor switching means being responsive to the second one of said logic voltage levels to render said transistor switching means nonconductive whereby the voltage on said reference voltage output terminal varies between a maximum value defined by said reference voltage source and a value substantially equal to zero volts at a rate determined by said RC time constant means, said first logic voltage level being effected in response to an "OFF" command being initiated, and said second logic voltage level being effected in response to an "ON" command being initiated.

10. Means as defined in claim 7 wherein said current impulse generating means comprise a differential amplifier to which said reference and control voltages are applied as respective first and second inputs, said differential amplifier being adapted to switch from a first saturation voltage level to a second and oppositely polarized saturation voltage level when said control voltage input crosses over the instantaneous magnitude of the reference voltage input applied thereto, and output means associated with said differential amplifier to generate a current impulse in response to said aforedefined differential amplifier input voltage crossover.

11. Means as defined in claim 8 wherein said current impulse generating means comprise a differential amplifier to which said reference and control voltages are applied as respective first and second inputs, said differential amplifier being adapted to switch from a first saturation voltage level to a second and oppositely polarized saturation voltage level when said control voltage input crosses over the instantaneous magnitude of the reference voltage input applied thereto, and output means associated with said differential amplifier input voltage crossover.

12. Means as defined in claim 9 wherein said current impulse generating means comprises a differential amplifier to which said reference and control voltages are applied as respective first and second inputs, said differential amplifier being adapted to switch from a first saturation voltage level to a second and oppositely polarized saturation voltage level when said control voltage input crosses over the instantaneous magnitude of the reference voltage input applied thereto, and output means associated with said differential amplifier to generate a current impulse in response to said aforedefined differential amplifier input voltage crossover.

UNITED STATES PATENT OFFICE
CERTIFICATE OF CORRECTION

Patent No. 3,621,373          Dated   November 16, 1971

Inventor(s) Daniel M. Mitchell and Chandrakant Mehta

It is certified that error appears in the above-identified patent and that said Letters Patent are hereby corrected as shown below:

Column 1, line 3, delete "this relates" and substitute therefor --this invention relates--; line 3, delete "switching an more" and substitute therefor --switching and more--; line 17, delete "or electrically may" and substitute therefor --or electronically may--; line 22, delete "mechanical contactors such as"; line 23, delete "relays or input switches in high power applications have three"; line 24, delete "significant undesirable characteristics"; column 2, line 59, after "illustrates" insert --a--; after "means" insert --of--; column 3, line 71, delete "application" (first occurrence) and substitute therefor --applications--; column 4, line 11, delete "12" (second occurrence) and substitute therefor -- -12--; line 35, before "voltage" insert --positive--; line 56, delete "4" and substitute therefor --44--; column 5, line 19, after "resistors" insert --54--; column 8, line 64, after "voltage" insert --to a substantially zero voltage--; line 65, delete "one" and substitute therefor --ones--; line 72, delete "a"; column 9, line 7, delete "with" and substitute therefor --which--; column 10, line 26, after "amplifier" insert --to generate a current impulse in response to said aforedefined differential amplifier--.

Signed and sealed this 23rd day of May 1972.

(SEAL)
Attest:

EDWARD M.FLETCHER,JR.           ROBERT GOTTSCHALK
Attesting Officer               Commissioner of Patents